Figure 1:
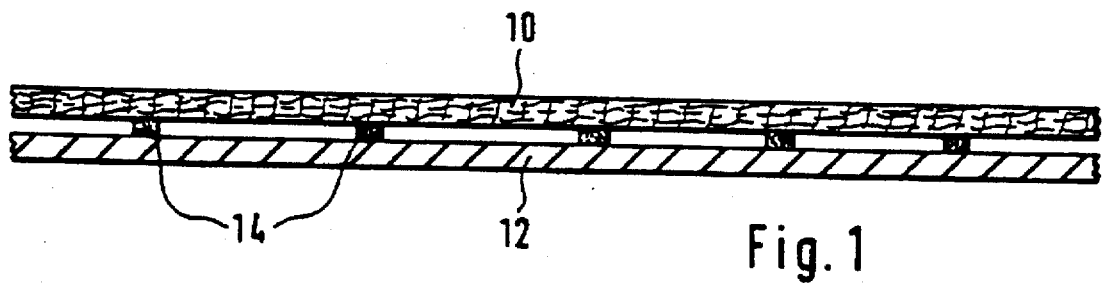

United States Patent [19]
Boich et al.

[11] Patent Number: 5,683,787
[45] Date of Patent: Nov. 4, 1997

[54] MULTILAYERED ELASTIC SHEET STRUCTURE AND PROCESS FOR PRODUCING A MULTILAYERED ELASTIC SHEET STRUCTURE

[75] Inventors: Heinz-Horst Boich; Myrtha Wehrle, both of Peine; Attila A. Tamer, Schwalbach am Taunus; Peter Coles, Kelkheim; See-Aun Soon, Schwalbach am Taunus, all of Germany

[73] Assignees: Corovin GmbH, Peine, Germany; The Proctor & Gamble Company, Cincinnati, Ohio

[21] Appl. No.: 454,384

[22] PCT Filed: Dec. 8, 1993

[86] PCT No.: PCT/DE93/01177

§ 371 Date: Aug. 1, 1995

§ 102(e) Date: Aug. 1, 1995

[87] PCT Pub. No.: WO94/14607

PCT Pub. Date: Jul. 7, 1994

[30] Foreign Application Priority Data

Dec. 18, 1992 [DE] Germany .................... 42 43 012.7

[51] Int. Cl.$^6$ ...................................... B32B 9/00
[52] U.S. Cl. ..................... 428/198; 428/74; 428/77; 428/131; 428/152; 428/184; 428/284; 428/286; 428/297; 428/298; 428/317.9; 604/385.2; 156/163; 156/229
[58] Field of Search ............... 428/74, 77, 283, 428/286, 298, 311.5, 317.1, 360, 317.9, 362, 131, 369, 152, 184, 284, 288, 297, 253, 215, 212, 198; 604/385.2, 385.1; 156/163, 164, 229

[56] References Cited

U.S. PATENT DOCUMENTS

| | | |
|---|---|---|
| 4,446,189 | 5/1984 | Romanek . |
| 4,720,415 | 1/1988 | Vander Wielen et al. . |
| 4,741,944 | 5/1988 | Jackson et al. . |
| 4,863,779 | 9/1989 | Daponte . |
| 4,891,258 | 1/1990 | Fahrenkrug ........................ 428/138 |
| 4,935,287 | 6/1990 | Johnson et al. . |

FOREIGN PATENT DOCUMENTS

| | | |
|---|---|---|
| 0 217 032 | 4/1987 | European Pat. Off. . |
| 0 321 980 | 6/1989 | European Pat. Off. . |

Primary Examiner—Patrick Ryan
Assistant Examiner—Abraham Bahta
Attorney, Agent, or Firm—Burns, Doane, Swecker & Mathis, L.L.P.

[57] ABSTRACT

A multilayered elastic sheetlike structure and a process for producing it are described.

The sheetlike structure consists of at least one elastomeric layer of a homogeneous film/sheet and at least one inelastic fibre or filament layer which is connected to the elastomeric layer at mutually spaced-apart connection sites. Between the connection sites the fibre or filament layer is in folds when the elastomeric layer is in an untensioned or partially tensioned state and smooth when the elastomeric layer is in the completely tensioned state. The inelastic fibre or filament layer consists of an originally smooth, undrawn or partially drawn material which has been melted or adhered to the untensioned elastomeric layer at the connection sites and, after conjoint extension therewith, exhibits a persistent extension.

21 Claims, 3 Drawing Sheets

ERSATZBLATT

MULTILAYERED ELASTIC SHEET STRUCTURE AND PROCESS FOR PRODUCING A MULTILAYERED ELASTIC SHEET STRUCTURE

The invention relates to a multilayered elastic sheetlike structure as classified in the preamble of claim 1.

Such a multilayered elastic sheetlike structure is already known from U.S. Pat. No. 4,446,189. The known sheetlike structure comprises a layer of an elastic material, for example a polyurethane foam or else a non-cellular material, which is connected to an inelastic fibre or filament layer at mutually spaced-apart connection sites. In the process of production, an originally flat fibre or filament layer is connected to an elastic layer in the untensioned stabs thereof by a needling process, then the compound material is stretched as a whole, and finally unstressed again. In this process, the inelastic fibre or filament layer undergoes a permanent extension and, after untensioning, becomes wavy between the connection sites to the elastic layer, whereas the elastic layer, except for a permanent residual extension, returns substantially back into the original state.

A further multilayered elastic sheetlike element is known from EP Patent 0,217,032. This sheetlike structure differs in the production process from the aforementioned one in that a drawn inelastic fibre or filament layer is used and this layer is connected to an extended elastic layer at spaced-apart connection sites and subsequently the entire sheetlike structure is untensioned. Here too the inelastic fibre or filament layer then becomes wavy between the connection points. The elastic layer is formed of a woven, elastic fibre web.

The known multilayered elastic sheetlike structures have the decisive disadvantage that they are uncheckedly liquid-permeable over their entire area. This is immediately evident in the case of the sheetlike structure of EP Patent 0,217,032, since it after all is based exclusively on fibrous layers.

However, even in the case of the sheetlike structure of U.S. Pat. No. 4,446,189 in the version where the elastic layer consists of a non-cellular material, liquid permeability occurs. It is in this case due to the needling process. Needling sews the fibres or filaments of the inelastic layer to the elastic layer composed of non-cellular material by means of needles. The needles pass through the elastic layer, taking along individual fibres or filaments which, however, as the needles return, remain in the holes formed. The resulting connection of the elastic layer to the non-elastic layer is non-positive. Thus, under mechanical stress, the fibres or filaments can be pulled back out of the holes of the elastic layer, and this effect does indeed occur when the sheetlike structure is extended.

Even if it is assumed that the damage to the elastic layer due to the needling process falls short of leading to a significant increase in the liquid permeability, since, after all, the holes formed in the course of the needling are substantially sealed up again by the fibres punched therethrough, the holes re-open when the sheetlike structure is extended, as a result of the fibres slipping out, and let liquid pass through in an unchecked fashion. In addition, when the sheetlike structure is extended, it is impossible to stretch the fibres to any significant extent, at any rate not into the region of their extension breaking strength. On the contrary, as the force of the extension increases, they slip out of the holes in the elastic layer before that point is reached. This leads only to a minimal increase in the volume occupied by the fibre or filament layer after the extending and subsequent untensioning of the sheetlike structure, as compared with the volume prior to the extending and untensioning.

A further disadvantage of the needling-based technology is that only fibrous layers having relatively short fibres, preferably staple fibres, are suitable for needling, since only short fibres will regularly slide past one another to go from the horizontal assembly into the vertical assembly through the elastic layer. Long fibres in spunbonded webs or melt-blown webs, by contrast, are held by adjacent fibres over a greater length and thus are not freely movable. However, the restriction to short fibres has a consequence, owing to the production technology for short fibres, that only fibres having a relatively large diameter can be used. Achieving a certain homogeneity and thickness for the layer composed of the fibres or filaments therefore requires a relatively large amount of material. In the case of the known sheetlike structures, it is therefore not possible to achieve a basis weight for the fibre or filament layer of below 15 g/m$^2$.

The known materials are unsuitable for use as constituents of diapers, since, after all, with this product it is crucial, on the one hand, to prevent the transfer of body fluid to garments, but, on the other, to permit a material-saving and inexpensive manufacture.

It is therefore the object of the invention to improve a multilayered elastic sheetlike structure to the effect that a complete liquid-impermeability or a controlled liquid-permeability is achievable and at the same time a voluminous textile surface is created with a minimal use of material.

This object is achieved in a multilayered elastic sheetlike structure by the features indicated in the characterizing portion of claim 1.

By using a film/sheet as elastic layer, the elastic and liquid-confining properties are combined in one layer. This has advantageous consequences in relation to minimizing the weight and the thickness of the material. The low thickness of the material is very important in that the resistance to bending and flexing is reduced. Since the non-elastic fibre or filament layer, after all, forms folds in the untensioned state, it does not in any way impair the resistance to bending and flexing or extension. It is thus possible to produce even small bending radii without the material wanting to spring back into its original planar state. This, especially in the use for diapers, makes possible good adaptation and conformation to various parts of the body.

The inelastic fibre or filament layer produces a textile character which prevents the elastic film/sheet from coming into direct contact with the body.

The melting or adhering of the inelastic fibre or filament layer to the elastomeric layer ensures that the elastomeric layer does not suffer any mechanical damage. Its original liquid-impermeable property is not impaired thereby. Furthermore, the melting or adhering connects the layers to one another very firmly, positively in the case of melting and non-positively in the case of adhering. In the course of the conjoint extending of the sheetlike structure, the fibres or filaments would therefore be unable to detach themselves from the connection sites, and instead they will be drawn by the amount by which the sheetlike structure is extended. In the process, the formation of folds in the course of the subsequent untensioning of the sheetlike structure leads to an increase in the volume of the inelastic fibre or filament layer by about the value by which the sheetlike structure was extended compared with its original state.

It is further particularly advantageous that the inelastic fibre or filament layer can be produced using without exception any web-forming technologies. It is thus possible to use even very thin, long fibres, as a result of which the volume gain of the inelastic fibre or filament layer, compared with the material volume used, becomes very high.

This results not only in a soft, fluffy surface, which is particularly skin-friendly in connection with diapers, but also in a large absorption and take-up capacity for liquid. Consequently, the inelastic fibre or filament layer is also suitable for use as an initial, intermediate store for liquid. This property is utilizable with particular advantage in diapers in order that the quantities of urine, which are given off in phases, may not escape from the diaper before they are absorbed and chemically bound by the final storage layer. In this case, of course, the sheetlike structure is not left liquid-impermeable, but, through the application of perforation holes, is constructed in such a way that, after urination, the liquid intermediately stored in the fibre or filament layer can pass through the perforated elastomeric layer to the final storage layer in a controlled fashion.

In contradistinction to the state of the art, the originally liquid-tight, elastomeric layer provides through the application of perforations for the creation of a controlled liquid-permeability. The liquid-permeability has thus not arisen by chance, through mechanical damage due to needling.

The perforations in the elastomeric layer can also be arranged over only part of the area of the elastomeric layer and, what is more, have a non-uniform density and/or width of their perforation openings. For instance, in the case of a diaper, a particularly high density and width of the perforation openings can be arranged in the middle thereof in order that the passage of liquid may be facilitated there, whereas towards the edges the density and width of the perforation openings decrease or no perforation openings are present at all there in order that the liquid, as long as it is not chemically bound, cannot in these regions pass back through the film in the opposite direction and escape.

Suitable as material for the fibres or filaments of the inelastic fibre or filament layer are endless fibres, which can be produced by means of a melt-spinning process as spunbonded web, or finite microfibres, which can be produced as melt-blown web as part of a melt-blowing process.

The last-mentioned process makes it possible to produce particularly thin fibres of less than 0.1 dtex and these fibres can also be arranged in a very low layer thickness, since they may be connected to the elastomeric layer in the course of the production and then conjointly further processed therewith. This is because melt-blown webs having-a layer thickness which visually is just sufficient to reveal a homogeneous structure can no longer be handled individually. However, connection to the elastomeric layer makes it possible to limit the use of material so that the inelastic fibre or filament layer portion only has a basis weight between 2 and 10 g/m². The low amount of material used notwithstanding, the stretching and fold-forming step after the untensioning of the sheetlike structure does produce a high volume textile layer.

The elastic properties can be made as a matter of choice either one-dimensional or two-dimensional, the one-dimensional option being particularly simple to realize since the sheetlike structure only has to be drawn in the direction of movement of the web.

In a preferred embodiment, the inelastic fibre or filament layer has a permanent extension of at least 150%, based on the original length, and an elastomeric layer has a breaking extension of at least 150%, preferably between 250 and 500%, each based on the original length. In the later handling the material is then mechanically particularly resistant, since, in the step of extension, the inelastic fibre or filament layer will prevent further extension even before the breaking extension of the elastomeric layers is reached and will thus prevent destruction due to the sheetlike structure tearing.

The invention further relates to a process for producing a multilayered elastic sheetlike structure as classified in the preamble of claim 13.

In this respect the object of the invention is to specify a process for producing a multilayered elastic sheetlike structure which possesses complete liquid-impermeability or a controlled liquid-permeability and at the same time a high-volume textile surface coupled with minimal use of materials.

This object is achieved in relation to a process classified in the preamble of claim 12 by the features indicated in the characterizing portion.

Advantageously, the sheetlike structure is produced in directly successive process steps. The non-elastic fibre or filament layer can be formed by the melt-spinning process or by the melt-blowing process on a web laydown apparatus. The web layer present on the laydown belt and further transported thereon then has placed on top of it the elastomeric layer. In this process, the elastomeric layer can either be fabricated simultaneously or else be pre-fabricated and be supplied to the web layer off a roll. In a subsequent process step, the layers present on the laydown belt, namely the non-elastic fibre or filament layer and the elastomeric layer, are connected to each other at the contemplated connection sites, for example by calender rolling. Subsequently the sheetlike structure is extended to the extension limit of the fibres or filaments of the inelastic fibre or filament layer and then untensioned again, whereupon it returns, except for a permanent extension, back into the original state and the breaking inelastic fibre or filament layer forms folds.

If the connection is formed by melting, the inelastic fibre or filament layer end the elastomeric layer are placed directly on top of each other and subjected to pressure and temperature impingement.

In the case of adhesion, either the inelastic fibre or filament layer or the elastomeric layer are provided with a layer of adhesive which is activable by pressure and/or heating before the two components of the sheetlike structure are laid on top on each other and connected to each other at the contemplated connection sites.

It is particularly advantageous to carry out the connecting step immediately following the production of the web and of the elastomeric layer, since in this case the connecting step requires only pressure impingement, and the residual heat from the process of producing the inelastic fibre or filament layer and/or the elastomeric layer can be utilized.

Refinements and advantageous embodiments of the invention will be apparent from the claims, the rest of the description and the drawing by means of which the invention is more particularly described.

Figure 2:
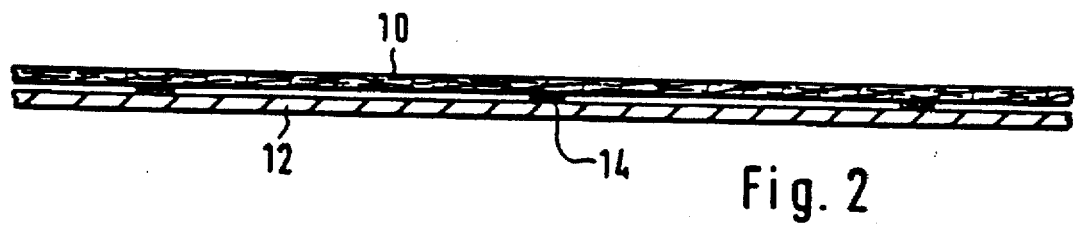
Figure 3:
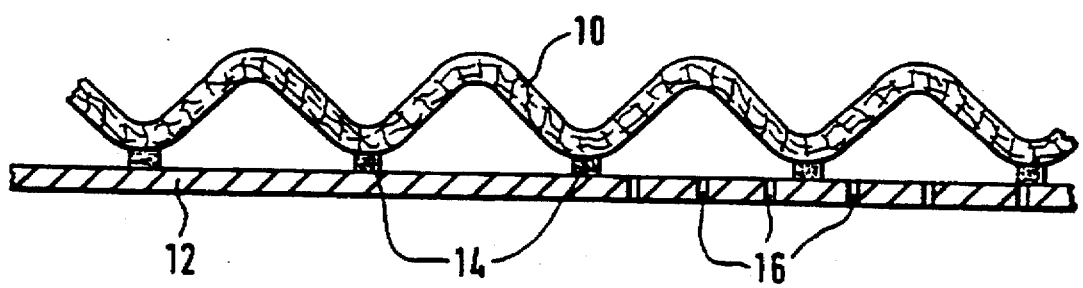
Figures 4, 5:
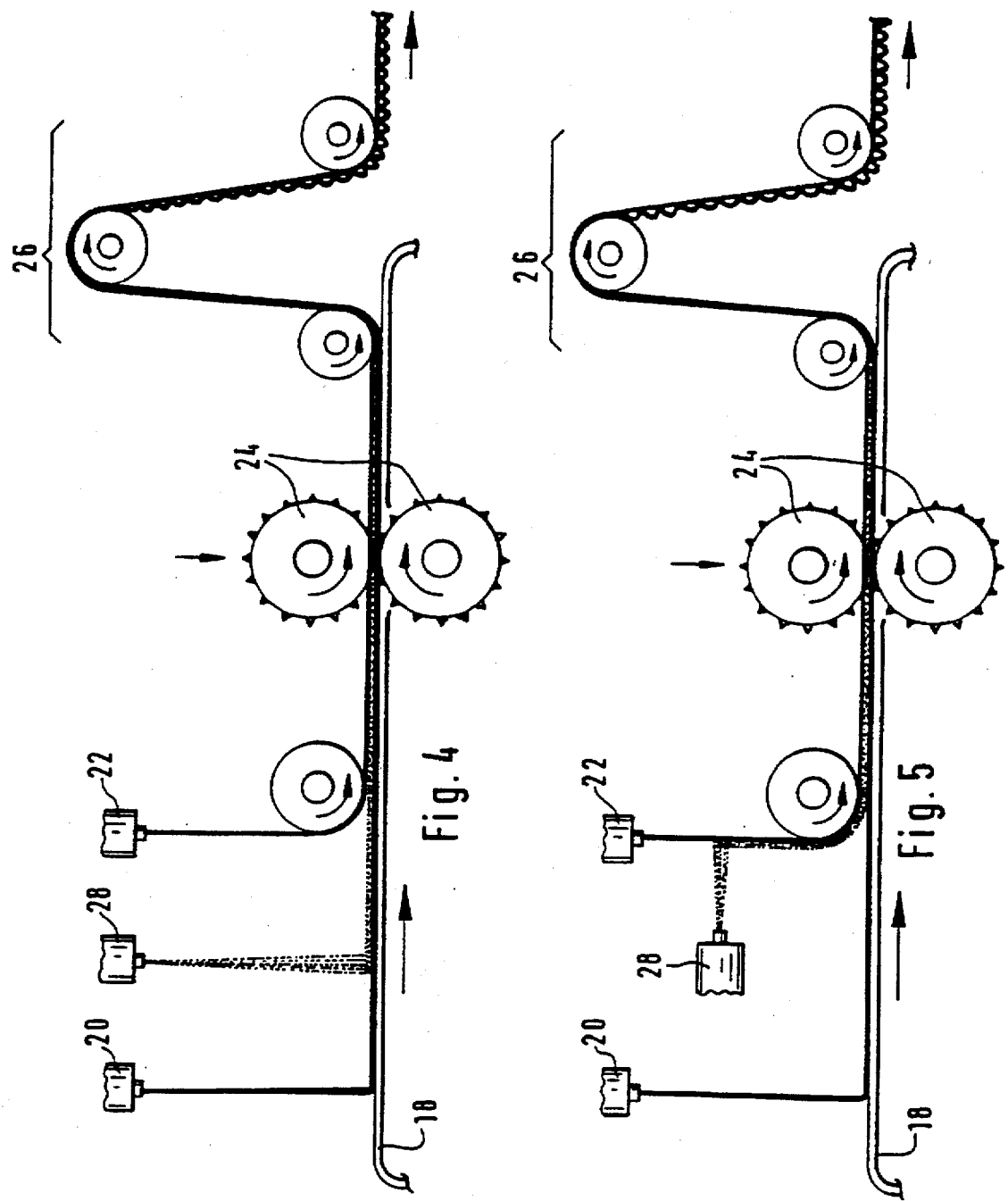
Figure 6:
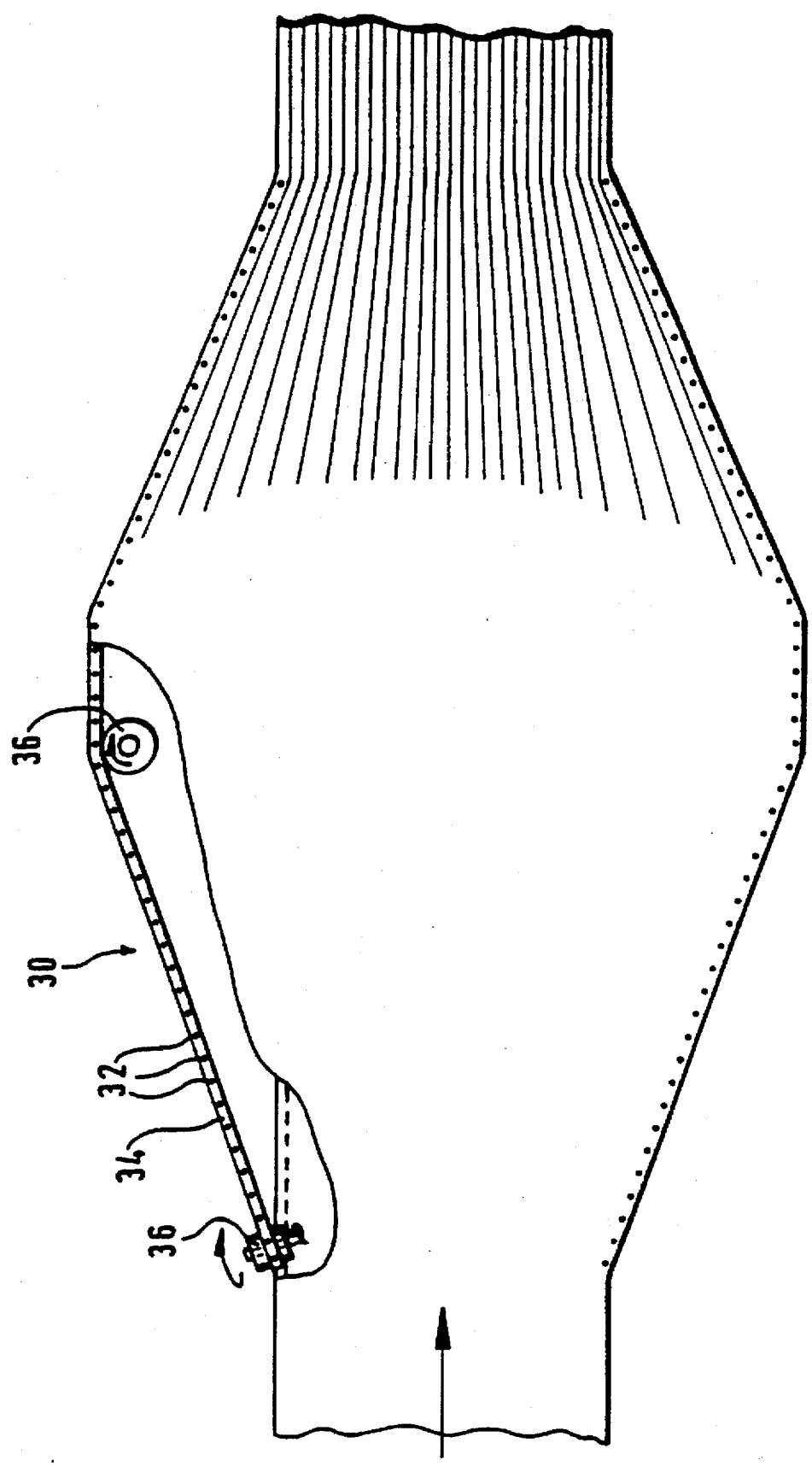

In the drawing:

FIG. 1 is a section through a multilayered elastic sheetlike structure in the initially unextended state, FIG. 2 is a section in the extended state, FIG. 3 is a section in the untensioned state, FIG. 4 shows an apparatus of a first embodiment for producing a multilayered sheetlike structure, and FIG. 5 shows a further alternative of one apparatus for producing the multilayered sheetlike structure, and FIG. 6 shows a stretching frame as part of an apparatus.

FIG. 1 shows a section through an originally unextended multilayered elastic sheetlike structure composed of a non-elastic fibre or filament layer 10 and an elastomeric layer 12 consisting of a homogeneous sheet/film. The two layers 10 and 12 are connected to each other at mutually spaced-apart connection sites 14. The connection can have been formed by melting or adhering by means of a layer of adhesive introduced between the two layers 10 and 12. Melting will produce a positive connection, while adhering will produce a non-positive connection which, however, can develop extremely high binding forces.

FIG. 2 shows the multilayered sheetlike structure in the extended state. In this state, the fibres or filaments of the non-elastic fibre or filament layer 10 are stretched as far as into the vicinity of their breaking extension limit.

FIG. 3 shows a section through the elastic sheetlike structure after untensioning. In this case the elastomeric layer 12 has returned back into its original state except for a permanent extension of about 20%, whereas the non-elastic fibre or filament layer 10 has formed folds between the spaced-apart connection points 14 in the manner of a concertina. This has increased the internal height of the layer thickness of the non-elastic fibre or filament layer 10, which manifests itself favourably not only in the fluffy textile handle but also in the take-up capacity for liquid.

FIG. 3 also shows a perforation 16 in the elastomeric layer 12, which can be effected as an alternative if the multilayered sheetlike structure is to be constructed as controlledly liquid-permeable. If a perforation is to be applied, the density and width of the perforation openings 16 can be pre-specified in a specific manner, so that a controlled liquid-permeability applies. In the case of an elastomeric layer which was mechanically damaged, for example by a needling process, there is in contrast, no control of liquid permeability. In this case, therefore, the liquid-permeability can only be referred to as uncontrolled.

The liquid-storing properties of the non-elastic fibre or filament layer 10 and the controlledly liquid-permeable properties of the elastic layer 12 are of particular advantage when used in diapers. This is because the multilayered sheetlike structure can form the body-facing component of the end storage layer provided with wadding fibres and chemical binding agents. In this case, phasewise discharges of urine can initially be intermediately stored in the high-volume non-elastic fibre or filament layer 10 and the intermediately stored liquid can subsequently slowly be guided via the perforation openings in the manner of a drainage into the underlying wadding layer and become chemically bound there. Any flow-back of liquid not as yet chemically bound is prevented or at least impaired as a result of the fact that the voids formed underneath the folds of the fibre or filament layer do not develop any capillary action and hence can no longer fetch back the liquid from below through the perforation openings of the elastomeric layer against the force of gravity.

In this way it is possible to produce a sheetlike structure which is liquid-permeable only in one direction and blocks the passage of liquid in the other direction.

In the embodiment as a non-perforated elastomeric layer, the sheetlike structure can form the outer surface of the diaper which is next to the clothing. In this case the sheetlike structure is completely liquid-impermeable, but has pleasant textile properties. With fundamentally identical materials it is thus possible to achieve the desired properties solely through perforation or non-perforation of the elastomeric layer.

FIGS. 4 and 5 show apparatus for producing a multilayered elastic sheetlike structure. Initially a web is produced on the laydown belt 18 of a laydown apparatus, alternatively by the spunbonded web process or by the melt-blowing process. To this end, there is disposed above the laydown belt 18 a nozzle apparatus 20 for the emerging melt, which in the case of a spinning apparatus my be constructed as a spinning manifold or in the case of a melt-blowing apparatus as an arrangement of melt blowing nozzles.

An elastomeric sheet is produced in the transport direction at a distance from the nozzle arrangement 20. This is diagrammatically indicated with a nozzle 22, from which the sheet material emerges. Alternatively, however, it would also be possible to unwind an externally fabricated sheet off a roll and supply it to the laydown belt 18.

Further in the transport direction of the laydown belt 18 there are disposed calender rolls 24, with whose aid the layers lying on top of each other are connected to one another at selected connection sites.

This is followed, again in the transport direction, by an extension apparatus 26 where the sheetlike structure is moved with an elevated transport speed so that drawing takes place. Subsequently this process is reversed, so that the sheetlike structure untensions back to approximately its original dimensions, To create a layer of contact adhesive, a nozzle arrangement 28 for producing a layer of contact adhesive is disposed between the position of the spinning or melt blowing nozzles 20 and the apparatus 22 for creating or supplying the elastomeric layer. This contact adhesive layer apparatus can of course be dispensed with if the connection between the inelastic fibre or filament layer and the elastomeric layer is brought about by melting.

FIG. 4 shows the alternative, where the layer of adhesive is applied atop the inelastic fibre or filament layer, and FIG. 5 shows the second alternative, at which the adhesive layer is applied atop the face of the film/sheet facing the inelastic fibre or filament layer, i.e. atop the elastomeric layer.

FIG. 6 finally shows a stretching frame 30 whereby an extension can be effected transversely to the web direction. If only a one-dimensional extension is desired transversely to the web direction, the stretching frame 30 can he used in place of the extension apparatus 26. For a two-dimensional extension, namely not only in the web direction but also transversely thereto, there is an additional need for the stretching frame 30 and it is disposed either upstream or downstream of the extension apparatus 26.

The stretching frame 30 comprises two endless belts 34 which are equipped with catches 32 and which run over guide rollers 36 and describe a path which, starting from the outer surfaces of an unstretched web-shaped sheetlike structure, leads initially at an inclined angle away from the web centre axis, subsequently extends parallel to the web centre axis for a brief period, and finally leads back inwards until the original distance from the web centre axis is reached. The catches 32 engage the web-shaped sheetlike structure from the outside, so that, in the course of its further transport, because of the path of the endless belts 34, it is initially extended and then untensioned again.

We claim:

1. A multilayered elastic sheet structure suitable for use in diapers composed of at least one homogeneous elastomeric layer and at least one inelastic fibrous layer which is connected to said elastomeric layer at mutually spaced-apart connection points and is laid in folds between said connection points when said elastomeric layer is in an untensioned state and is nonfolded when said elastomeric layer is in a tensioned state, wherein said inelastic fibrous layer was originally provided as a nonfolded material of continuous fibers or finite microfibres, was fused or adhered to said elastomeric layer at said connection points when said elastomeric layer was untensioned, and subsequently was extended up to the vicinity of the breaking extension limit of said fibers or microfibers.

2. Multilayered elastic sheet structure according to claim 1, characterized in that the elastomeric layer is perforated over its entire area.

3. Multilayered elastic sheet structure according to claim 1, characterized in that the elastomeric layer is partially perforated.

4. Multilayered elastic sheet structure according to claim 2, characterized in that the elastomeric layer exhibits a nonuniform density and/or width of the perforation openings over its entire or partial area.

5. Multilayered elastic sheet structure according to claim 1, characterized in that the inelastic fibre or filament layer consists of endless fibres.

6. Multilayered elastic sheet structure according to claim 1, characterized in that the inelastic fibre or filament layer consists of finite microfibres whose length is a multiple of the distance between two immediately adjacent connection sites and whose basis weight is within the range of preferably 2 to 10 g/m$^2$.

7. Multilayered elastic sheet structure according to claim 1, characterized in that the inelastic fibre or filament layer consists of finite staple fibres between 20 and 100 mm in length.

8. Multilayered elastic sheet structure according to claim 1, characterized in that the elastomeric layer and/or the inelastic fibre or filament layer supports a layer of contact adhesive which is activable by pressure impingement or heating and which, the mutually spaced-apart connection sites, forms a non-positive connection between the elastomeric layer and the inelastic fibre or filament layer.

9. Multilayered elastic sheet structure according to claim 8, characterized in that the layer of contact adhesive contains a portion with a fibrous structure.

10. Multilayered elastic sheet structure according to claim 1, characterized in that the elastic properties are one- or two-dimensional.

11. Multilayered elastic sheet structure according to claim 10, characterized in that in the case of a web-shaped sheetlike structure with one-dimensional elastic properties the elasticity extends transversely to the web direction.

12. Multilayered elastic sheet structure according to claim 1, characterized in that the inelastic fibre or filament layer has a permanent extension of at least 150%, based on the original length, and the elastomeric layer has a permanent extension of at most 20% after a first extension and a breaking extension of at least 150%, preferably between 250 and 500%, each based on the original length.

13. Process for producing a multilayered elastic sheet structure composed of at least one elastomeric layer of a homogeneous film/sheet and at least one inelastic fibre or filament layer which is connected to the elastomeric layer at mutually spaced-apart connection sites, the elastomeric layer in the untensioned state and the inelastic fibre or filament layer, which consists of an undrawn or partially drawn material, being first placed flat one on top of the other, characterized in that the elastomeric layer and the inelastic fibre or filament layer are then melted or adhered together at the mutually spaced-apart connection sites, then conjointly extended up to in the vicinity of the breaking extension limit of the fibres or filaments of the inelastic fibre or filament layer and finally untensioned again.

14. Process according to claim 13, characterized in that the elastomeric layer is perforated over its entire area or partially.

15. Process according to claim 13, characterized in that first a fibre or filament layer is produced on a laydown belt of a melt-spinning or melt-blowing range, in that subsequently an elastomeric layer, produced in a simultaneous or separate process, is supplied, laid down on the fibre or filament layer transported on the laydown belt of the melt-spinning or melt-blowing range and is melted or adhered thereto at selected connection sites to form a multilayered sheet structure, and in that the sheet structure is thereafter extended either transversely to the transport direction or in the transport direction or both transversely to the transport direction and in the transport direction, in the vicinity of the breaking extension limit of the fibres or filaments of the inelastic fibre or filament layer and finally untensioned again.

16. Process according to claim 15, characterized in that the fibre or filament layer transported on the laydown belt of the melt-spinning or melt-blowing range or the elastomeric layer contemplated for contact with the fibre or filament layer has applied to it, before the layers are brought together, a layer of contact adhesive activable by pressure impingement or heating.

17. Process according to claim 15, characterized in that the connection of the elastomeric layer to the inelastic fibre or filament layer is brought about at the selected connection sites by melting together or activating a layer of adhesive by pressure impingement utilizing the residual heat left over from the processes of producing the elastomeric layer and/or the inelastic fibre or filament layer.

18. Process according to claim 13, characterized in that the inelastic fibre or filament layer and the elastomeric layer are conjointly extended to between 100% and 250% of their original length.

19. Multilayered elastic sheet structure according to claim 3, characterized in that the elastomeric layer exhibits a nonuniform density and/or width of the perforation openings over its entire or partial area.

20. Process according to claim 14, characterized in that first a fibre or filament layer is produced on a laydown belt of a melt-spinning or melt-blowing range, in that subsequently an elastomeric layer, produced in a simultaneous or separate process, is supplied, laid down on the fibre or filament layer transported on the laydown belt of the melt-spinning or melt-blowing range and is melted or adhered thereto at selected connection sites to form a multilayered sheetlike structure, and in that the sheetlike structure is thereafter extended either transversely to the transport direction or in the transport direction or both transversely to the transport direction and in the transport direction, in the vicinity of the breaking extension limit of the fibres or filaments of the inelastic fibre or filament layer and finally untensioned again.

21. Process according the claim 16, characterized in that the connection of the elastomeric layer to the inelastic fibre or filament layer is brought about at the selected connection sites by melting together or activating a layer of adhesive by pressure impingement utilizing the residual heat left over from the processes of producing the elastomeric layer and/or inelastic fibre or filament layer.

* * * * *